United States Patent
Thibeault et al.

(10) Patent No.: US 9,113,181 B2
(45) Date of Patent: Aug. 18, 2015

(54) DYNAMIC CHANNEL BONDING PARTIAL SERVICE TRIGGERING

(75) Inventors: Brian K. Thibeault, Attleboro, MA (US); Chris R. Jones, Chichester (GB)

(73) Assignee: ARRIS Technology, Inc., Suwanee, GA (US)

(*) Notice: Subject to any disclaimer, the term of this patent is extended or adjusted under 35 U.S.C. 154(b) by 0 days.

(21) Appl. No.: 13/324,618

(22) Filed: Dec. 13, 2011

(65) Prior Publication Data
US 2013/0148707 A1   Jun. 13, 2013

(51) Int. Cl.
H04N 21/63    (2011.01)
H04N 21/2383  (2011.01)
H04N 21/2385  (2011.01)
H04N 21/61    (2011.01)

(52) U.S. Cl.
CPC ....... *H04N 21/2383* (2013.01); *H04N 21/2385* (2013.01); *H04N 21/6118* (2013.01)

(58) Field of Classification Search
CPC ................ H04L 12/2801; H04L 29/06455; H04L 12/2861; H04N 21/6118; H04N 21/6168; H04N 21/631; H04B 10/03
USPC ................................... 370/389; 725/111, 114
See application file for complete search history.

(56) References Cited

U.S. PATENT DOCUMENTS

| | | |
|---|---|---|
| 3,838,221 A | 9/1974 | Schmidt et al. |
| 4,245,342 A | 1/1981 | Entenman et al. |
| 4,385,392 A | 5/1983 | Angell et al. |
| 4,811,360 A | 3/1989 | Potter |
| 4,999,787 A | 3/1991 | McNally et al. |
| 5,228,060 A | 7/1993 | Uchiyama |
| 5,251,324 A | 10/1993 | McMullan et al. |
| 5,271,060 A | 12/1993 | Moran et al. |
| 5,278,977 A | 1/1994 | Spencer et al. |

(Continued)

FOREIGN PATENT DOCUMENTS

| | | |
|---|---|---|
| DE | 69631420 T2 | 12/2004 |
| EP | 1235402 A2 | 8/2002 |

(Continued)

OTHER PUBLICATIONS

Cable Television Laboratories, Inc., "Data-Over-Cable Service Interface Specifications DOCSIS 3.0: MAC and Upper Layer Protocols Interface", CM-SP-MULPIv3.0-I16-110623, Jun. 2011, section 8, pp. 242-266.

(Continued)

*Primary Examiner* — Benjamin Lamont
(74) *Attorney, Agent, or Firm* — Stewart M. Wiener

(57) ABSTRACT

A method and computing device for transitioning into and out of partial service mode to make bandwidth available for other resources. A trigger value is set for a channel, where a first and second cable modem have registered to use the channel, and where the first cable modem is a bonded channel modem that utilizes a bonding group that includes the channel and at least one other channel. A modulation mode for the channel is monitored. The channel is transitioned from full service mode to partial service mode when the channel is in full service mode and monitoring detects that the modulation mode is less than or equal to the trigger value. The channel is transitioned from partial service mode to full service mode when the channel is in partial service mode and the modulation mode for the channel is greater than the trigger value.

18 Claims, 2 Drawing Sheets

(56) References Cited

U.S. PATENT DOCUMENTS

| | | |
|---|---|---|
| 5,347,539 A | 9/1994 | Sridhar et al. |
| 5,390,339 A | 2/1995 | Bruckert et al. |
| 5,463,661 A | 10/1995 | Moran et al. |
| 5,532,865 A | 7/1996 | Utsumi et al. |
| 5,557,603 A | 9/1996 | Barlett et al. |
| 5,606,725 A | 2/1997 | Hart |
| 5,631,846 A | 5/1997 | Szurkowski |
| 5,692,010 A | 11/1997 | Nielsen |
| 5,694,437 A | 12/1997 | Yang et al. |
| 5,732,104 A | 3/1998 | Brown et al. |
| 5,790,523 A | 8/1998 | Ritchie et al. |
| 5,862,451 A | 1/1999 | Grau et al. |
| 5,867,539 A | 2/1999 | Koslov |
| 5,870,429 A | 2/1999 | Moran et al. |
| 5,886,749 A | 3/1999 | Williams et al. |
| 5,939,887 A | 8/1999 | Schmidt et al. |
| 5,943,604 A | 8/1999 | Chen et al. |
| 6,032,019 A | 2/2000 | Chen et al. |
| 6,061,393 A | 5/2000 | Tsui et al. |
| 6,108,351 A | 8/2000 | Hardy et al. |
| 6,120,896 A | 9/2000 | Jorkasky et al. |
| 6,154,503 A | 11/2000 | Strolle et al. |
| 6,177,840 B1 | 1/2001 | Opitz et al. |
| 6,229,792 B1 | 5/2001 | Anderson et al. |
| 6,230,326 B1 | 5/2001 | Unger et al. |
| 6,233,274 B1 | 5/2001 | Tsui et al. |
| 6,240,553 B1 | 5/2001 | Son et al. |
| 6,272,150 B1 | 8/2001 | Hrastar et al. |
| 6,278,730 B1 | 8/2001 | Tsui et al. |
| 6,308,286 B1 | 10/2001 | Richmond et al. |
| 6,310,909 B1 | 10/2001 | Jones |
| 6,321,384 B1 | 11/2001 | Eldering |
| 6,330,221 B1 | 12/2001 | Gomez |
| 6,334,219 B1 | 12/2001 | Hill et al. |
| 6,377,552 B1 | 4/2002 | Moran, III et al. |
| 6,385,773 B1 | 5/2002 | Schwartzman et al. |
| 6,389,068 B1 | 5/2002 | Smith et al. |
| 6,434,583 B1 | 8/2002 | Dapper et al. |
| 6,445,734 B1 | 9/2002 | Chen et al. |
| 6,456,597 B1 | 9/2002 | Bare |
| 6,459,703 B1 | 10/2002 | Grimwood et al. |
| 6,477,197 B1 | 11/2002 | Unger |
| 6,480,469 B1 | 11/2002 | Moore et al. |
| 6,483,033 B1 | 11/2002 | Simoes et al. |
| 6,498,663 B1 | 12/2002 | Farhan et al. |
| 6,512,616 B1 | 1/2003 | Nishihara |
| 6,526,260 B1 | 2/2003 | Hick et al. |
| 6,546,557 B1 | 4/2003 | Ovadia |
| 6,556,239 B1 | 4/2003 | Al-Araji et al. |
| 6,556,562 B1 | 4/2003 | Bhagavath et al. |
| 6,556,660 B1 | 4/2003 | Li et al. |
| 6,559,756 B2 | 5/2003 | Al-Araji et al. |
| 6,563,868 B1 | 5/2003 | Zhang et al. |
| 6,570,394 B1 | 5/2003 | Williams |
| 6,570,913 B1 | 5/2003 | Chen |
| 6,574,797 B1 | 6/2003 | Naegeli et al. |
| 6,588,016 B1 | 7/2003 | Chen et al. |
| 6,606,351 B1 | 8/2003 | Dapper et al. |
| 6,611,795 B2 | 8/2003 | Cooper |
| 6,646,677 B2 | 11/2003 | Noro et al. |
| 6,662,135 B1 | 12/2003 | Burns et al. |
| 6,662,368 B1 | 12/2003 | Cloonan et al. |
| 6,671,334 B1 | 12/2003 | Kuntz et al. |
| 6,687,632 B2 | 2/2004 | Rittman |
| 6,690,655 B1 | 2/2004 | Miner et al. |
| 6,700,875 B1 | 3/2004 | Schroeder et al. |
| 6,700,927 B1 | 3/2004 | Esliger et al. |
| 6,711,134 B1 | 3/2004 | Wichelman et al. |
| 6,741,947 B1 | 5/2004 | Wichelman et al. |
| 6,748,551 B2 | 6/2004 | Furudate et al. |
| 6,757,253 B1 | 6/2004 | Cooper et al. |
| 6,772,388 B2 | 8/2004 | Cooper et al. |
| 6,772,437 B1 | 8/2004 | Cooper et al. |
| 6,775,840 B1 | 8/2004 | Naegel et al. |
| 6,816,463 B2 | 11/2004 | Cooper et al. |
| 6,834,057 B1 | 12/2004 | Rabenko et al. |
| 6,839,829 B1 | 1/2005 | Daruwalla et al. |
| 6,853,932 B1 | 2/2005 | Wichelman et al. |
| 6,877,166 B1 | 4/2005 | Roeck et al. |
| 6,895,043 B1 | 5/2005 | Naegeli et al. |
| 6,895,594 B1 | 5/2005 | Simoes et al. |
| 6,906,526 B2 | 6/2005 | Hart, Jr. et al. |
| 6,928,475 B2 | 8/2005 | Schenkel et al. |
| 6,944,881 B1 | 9/2005 | Vogel |
| 6,961,314 B1 | 11/2005 | Quigley et al. |
| 6,961,370 B2 | 11/2005 | Chappell |
| 6,967,994 B2 | 11/2005 | Boer et al. |
| 6,973,141 B1 | 12/2005 | Isaksen et al. |
| 6,985,437 B1 | 1/2006 | Vogel |
| 6,987,754 B2 * | 1/2006 | Shahar et al. ............... 370/349 |
| 6,999,408 B1 | 2/2006 | Gomez |
| 7,002,899 B2 | 2/2006 | Azenkot et al. |
| 7,010,002 B2 | 3/2006 | Chow et al. |
| 7,017,176 B1 | 3/2006 | Lee et al. |
| 7,032,159 B2 | 4/2006 | Lusky et al. |
| 7,039,939 B1 | 5/2006 | Millet et al. |
| 7,050,419 B2 | 5/2006 | Azenkot et al. |
| 7,054,554 B1 | 5/2006 | McNamara et al. |
| 7,058,007 B1 | 6/2006 | Daruwalla et al. |
| 7,072,365 B1 | 7/2006 | Ansley |
| 7,079,457 B2 | 7/2006 | Wakabayashi et al. |
| 7,099,412 B2 | 8/2006 | Coffey |
| 7,099,580 B1 | 8/2006 | Bulbul |
| 7,139,283 B2 | 11/2006 | Quigley et al. |
| 7,142,609 B2 | 11/2006 | Terreault et al. |
| 7,145,887 B1 | 12/2006 | Akgun et al. |
| 7,152,025 B2 | 12/2006 | Lusky et al. |
| 7,158,542 B1 | 1/2007 | Zeng et al. |
| 7,164,694 B1 | 1/2007 | Nodoushani et al. |
| 7,177,324 B1 | 2/2007 | Choudhury et al. |
| 7,197,067 B2 | 3/2007 | Lusky et al. |
| 7,222,255 B1 | 5/2007 | Claessens et al. |
| 7,227,863 B1 | 6/2007 | Leung et al. |
| 7,242,862 B2 | 7/2007 | Saunders et al. |
| 7,246,368 B1 | 7/2007 | Millet et al. |
| 7,263,123 B2 | 8/2007 | Yousef |
| 7,274,735 B2 | 9/2007 | Lusky et al. |
| 7,295,518 B1 | 11/2007 | Monk et al. |
| 7,315,573 B2 | 1/2008 | Lusky et al. |
| 7,315,967 B2 | 1/2008 | Azenko et al. |
| 7,400,677 B2 | 7/2008 | Jones |
| 7,421,276 B2 | 9/2008 | Steer et al. |
| 7,451,472 B2 | 11/2008 | Williams |
| 7,492,703 B2 | 2/2009 | Lusky et al. |
| 7,554,902 B2 | 6/2009 | Kim et al. |
| 7,573,884 B2 | 8/2009 | Klimker et al. |
| 7,573,935 B2 | 8/2009 | Min et al. |
| 7,584,298 B2 | 9/2009 | Klinker et al. |
| 7,616,654 B2 | 11/2009 | Moran, III et al. |
| 7,650,112 B2 | 1/2010 | Utsumi et al. |
| 7,672,310 B2 | 3/2010 | Cooper et al. |
| 7,684,315 B1 | 3/2010 | Beser |
| 7,684,341 B2 | 3/2010 | Howald |
| 7,693,090 B1 | 4/2010 | Kimpe |
| 7,701,938 B1 * | 4/2010 | Bernstein et al. ............. 370/390 |
| 7,716,712 B2 | 5/2010 | Booth et al. |
| 7,739,359 B1 | 6/2010 | Millet et al. |
| 7,742,697 B2 | 6/2010 | Cooper et al. |
| 7,742,771 B2 | 6/2010 | Thibeault |
| 7,760,624 B1 | 7/2010 | Goodson et al. |
| 7,778,314 B2 | 8/2010 | Wajcer et al. |
| 7,787,557 B2 | 8/2010 | Kim et al. |
| 7,792,183 B2 | 9/2010 | Massey et al. |
| 7,826,569 B2 | 11/2010 | Popper et al. |
| 7,856,049 B2 | 12/2010 | Currivan et al. |
| 7,876,697 B2 | 1/2011 | Thompson et al. |
| 7,953,144 B2 | 5/2011 | Allen et al. |
| 7,958,534 B1 * | 6/2011 | Beser ........................... 725/111 |
| 7,970,010 B2 | 6/2011 | Denney et al. |
| 7,983,162 B1 | 7/2011 | Ford et al. |
| 8,000,254 B2 | 8/2011 | Thompson et al. |
| 8,037,541 B2 | 10/2011 | Montague et al. |
| 8,040,915 B2 | 10/2011 | Cummings |
| 8,059,546 B2 | 11/2011 | Pai et al. |

(56) References Cited

U.S. PATENT DOCUMENTS

| | | |
|---|---|---|
| 8,081,674 B2 | 12/2011 | Thompson et al. |
| 8,116,360 B2 | 2/2012 | Thibeault |
| 8,265,559 B2 | 9/2012 | Cooper et al. |
| 8,284,828 B2 | 10/2012 | Cooper et al. |
| 8,345,557 B2 | 1/2013 | Thibeault et al. |
| 8,473,995 B2* | 6/2013 | Beser ............................ 725/111 |
| 2001/0055319 A1 | 12/2001 | Quigley et al. |
| 2002/0038461 A1 | 3/2002 | White |
| 2002/0044531 A1 | 4/2002 | Cooper et al. |
| 2002/0091970 A1 | 7/2002 | Furudate et al. |
| 2002/0116493 A1 | 8/2002 | Schenkel et al. |
| 2002/0119783 A1* | 8/2002 | Bourlas et al. ................ 455/453 |
| 2002/0154620 A1 | 10/2002 | Azenkot et al. |
| 2002/0168131 A1 | 11/2002 | Walter et al. |
| 2002/0181395 A1 | 12/2002 | Foster et al. |
| 2003/0028898 A1 | 2/2003 | Howald |
| 2003/0043732 A1 | 3/2003 | Walton et al. |
| 2003/0067883 A1 | 4/2003 | Azenkot et al. |
| 2003/0067944 A1 | 4/2003 | Sala et al. |
| 2003/0101463 A1 | 5/2003 | Greene et al. |
| 2003/0108052 A1 | 6/2003 | Inoue et al. |
| 2003/0120819 A1 | 6/2003 | Abramson |
| 2003/0138250 A1 | 7/2003 | Glynn |
| 2003/0149991 A1 | 8/2003 | Reidhead et al. |
| 2003/0158940 A1 | 8/2003 | Leigh |
| 2003/0177502 A1* | 9/2003 | Kolze et al. ................... 725/111 |
| 2003/0179768 A1 | 9/2003 | Lusky et al. |
| 2003/0179770 A1 | 9/2003 | Reznic et al. |
| 2003/0179821 A1 | 9/2003 | Lusky et al. |
| 2003/0181185 A1 | 9/2003 | Lusky et al. |
| 2003/0182664 A1 | 9/2003 | Lusky et al. |
| 2003/0185176 A1 | 10/2003 | Lusky et al. |
| 2003/0188254 A1 | 10/2003 | Lusky et al. |
| 2003/0200317 A1 | 10/2003 | Zeitak et al. |
| 2003/0212999 A1 | 11/2003 | Cai |
| 2004/0015765 A1 | 1/2004 | Cooper et al. |
| 2004/0042385 A1 | 3/2004 | Kim et al. |
| 2004/0047284 A1 | 3/2004 | Eidson |
| 2004/0052248 A1 | 3/2004 | Frank et al. |
| 2004/0052356 A1 | 3/2004 | McKinzie et al. |
| 2004/0062548 A1 | 4/2004 | Obeda et al. |
| 2004/0073937 A1 | 4/2004 | Williams |
| 2004/0096216 A1 | 5/2004 | Ito |
| 2004/0109661 A1 | 6/2004 | Bierman et al. |
| 2004/0139473 A1 | 7/2004 | Greene |
| 2004/0163129 A1 | 8/2004 | Chapman et al. |
| 2004/0181811 A1 | 9/2004 | Rakib |
| 2004/0208513 A1 | 10/2004 | Peddanarappagari et al. |
| 2004/0233234 A1 | 11/2004 | Chaudhry et al. |
| 2004/0233926 A1 | 11/2004 | Cummings |
| 2004/0248520 A1 | 12/2004 | Miyoshi |
| 2004/0261119 A1 | 12/2004 | Williams |
| 2005/0010958 A1 | 1/2005 | Rakib et al. |
| 2005/0025145 A1 | 2/2005 | Rakib et al. |
| 2005/0034159 A1 | 2/2005 | Ophir et al. |
| 2005/0039103 A1* | 2/2005 | Azenko et al. ................ 714/776 |
| 2005/0058082 A1 | 3/2005 | Moran et al. |
| 2005/0064890 A1 | 3/2005 | Johan et al. |
| 2005/0097617 A1 | 5/2005 | Currivan et al. |
| 2005/0108763 A1 | 5/2005 | Baran et al. |
| 2005/0122996 A1 | 6/2005 | Azenkot et al. |
| 2005/0163088 A1 | 7/2005 | Yamano et al. |
| 2005/0175080 A1 | 8/2005 | Bouillett |
| 2005/0183130 A1 | 8/2005 | Sadja et al. |
| 2005/0198688 A1 | 9/2005 | Fong |
| 2005/0226161 A1 | 10/2005 | Jaworski |
| 2005/0281200 A1 | 12/2005 | Terreault |
| 2006/0013147 A1 | 1/2006 | Terpstra |
| 2006/0088056 A1 | 4/2006 | Quigley et al. |
| 2006/0121946 A1 | 6/2006 | Walton et al. |
| 2006/0250967 A1 | 11/2006 | Miller et al. |
| 2006/0262722 A1 | 11/2006 | Chapman et al. |
| 2007/0002752 A1 | 1/2007 | Thibeault et al. |
| 2007/0030805 A1 | 2/2007 | Pantelias et al. |
| 2007/0058542 A1 | 3/2007 | Thibeault |
| 2007/0076592 A1 | 4/2007 | Thibeault |
| 2007/0076789 A1 | 4/2007 | Thibeault |
| 2007/0076790 A1 | 4/2007 | Thibeault et al. |
| 2007/0086328 A1 | 4/2007 | Kao et al. |
| 2007/0094691 A1 | 4/2007 | Gazdzinski |
| 2007/0097907 A1 | 5/2007 | Cummings |
| 2007/0121712 A1 | 5/2007 | Okamoto |
| 2007/0133672 A1 | 6/2007 | Lee et al. |
| 2007/0143654 A1 | 6/2007 | Joyce et al. |
| 2007/0147489 A1 | 6/2007 | Sun |
| 2007/0177526 A1 | 8/2007 | Siripunkaw et al. |
| 2007/0184835 A1 | 8/2007 | Bitran et al. |
| 2007/0189770 A1 | 8/2007 | Sucharczuk et al. |
| 2007/0201547 A1 | 8/2007 | Willcocks et al. |
| 2007/0206600 A1 | 9/2007 | Klimker et al. |
| 2007/0206625 A1 | 9/2007 | Maeda |
| 2007/0211618 A1 | 9/2007 | Cooper et al. |
| 2007/0223512 A1 | 9/2007 | Cooper et al. |
| 2007/0223513 A1* | 9/2007 | Pantelias et al. .............. 370/442 |
| 2007/0223920 A1 | 9/2007 | Moore et al. |
| 2007/0245177 A1 | 10/2007 | Cooper et al. |
| 2008/0056713 A1 | 3/2008 | Cooper et al. |
| 2008/0062888 A1 | 3/2008 | Lusky et al. |
| 2008/0065960 A1 | 3/2008 | Cheng et al. |
| 2008/0069006 A1* | 3/2008 | Walter et al. .................. 370/252 |
| 2008/0075157 A1 | 3/2008 | Allen et al. |
| 2008/0101210 A1 | 5/2008 | Thompson et al. |
| 2008/0125984 A1 | 5/2008 | Skendzic et al. |
| 2008/0140823 A1 | 6/2008 | Thompson et al. |
| 2008/0193137 A1 | 8/2008 | Thompson et al. |
| 2008/0200129 A1 | 8/2008 | Cooper et al. |
| 2008/0242339 A1 | 10/2008 | Anderson |
| 2008/0250508 A1 | 10/2008 | Montague |
| 2008/0274700 A1 | 11/2008 | Li |
| 2008/0291840 A1 | 11/2008 | Cooper et al. |
| 2009/0031384 A1 | 1/2009 | Brooks et al. |
| 2009/0103557 A1 | 4/2009 | Hong et al. |
| 2009/0103669 A1 | 4/2009 | Kolze et al. |
| 2009/0109877 A1 | 4/2009 | Murray et al. |
| 2009/0249421 A1 | 10/2009 | Liu et al. |
| 2009/0252234 A1 | 10/2009 | Samdani et al. |
| 2010/0083356 A1 | 4/2010 | Steckley et al. |
| 2010/0095360 A1 | 4/2010 | Pavlovski et al. |
| 2010/0128739 A1* | 5/2010 | Jung et al. ..................... 370/458 |
| 2010/0154016 A1 | 6/2010 | Li et al. |
| 2010/0154017 A1 | 6/2010 | An et al. |
| 2010/0157824 A1 | 6/2010 | Thompson et al. |
| 2010/0158093 A1 | 6/2010 | Thompson et al. |
| 2010/0185391 A1 | 7/2010 | Lee et al. |
| 2010/0223650 A1 | 9/2010 | Millet et al. |
| 2010/0251320 A1 | 9/2010 | Shafer et al. |
| 2011/0026577 A1 | 2/2011 | Primo et al. |
| 2011/0030019 A1 | 2/2011 | Ulm et al. |
| 2011/0069745 A1 | 3/2011 | Thompson et al. |
| 2011/0072127 A1 | 3/2011 | Gerber et al. |
| 2011/0110415 A1 | 5/2011 | Cooper et al. |
| 2011/0150058 A1* | 6/2011 | Oh .................................. 375/222 |
| 2011/0153683 A1 | 6/2011 | Hoskinson |
| 2011/0194418 A1 | 8/2011 | Wolcott et al. |
| 2011/0194597 A1 | 8/2011 | Wolcott et al. |
| 2011/0197071 A1 | 8/2011 | Wolcott et al. |
| 2011/0243214 A1 | 10/2011 | Wolcott et al. |
| 2012/0027069 A1 | 2/2012 | Clausen et al. |
| 2012/0054312 A1 | 3/2012 | Salinger |
| 2012/0084416 A1 | 4/2012 | Thibeault et al. |
| 2012/0093240 A1 | 4/2012 | McFarland et al. |
| 2012/0147751 A1 | 6/2012 | Ulm |
| 2013/0041990 A1 | 2/2013 | Thibeault et al. |
| 2013/0051442 A1 | 2/2013 | Cooper et al. |
| 2013/0128723 A1 | 5/2013 | Thibeault et al. |
| 2013/0286852 A1 | 10/2013 | Bowler et al. |
| 2013/0290783 A1 | 10/2013 | Bowler et al. |
| 2013/0290791 A1 | 10/2013 | Basile et al. |
| 2013/0291034 A1 | 10/2013 | Basile et al. |
| 2013/0294489 A1 | 11/2013 | Thibeault et al. |
| 2014/0029654 A1 | 1/2014 | Thompson et al. |
| 2014/0029655 A1 | 1/2014 | Thompson et al. |
| 2014/0133533 A1 | 5/2014 | Thibeault et al. |
| 2014/0185428 A1 | 7/2014 | Thibeault et al. |

(56) References Cited

U.S. PATENT DOCUMENTS

FOREIGN PATENT DOCUMENTS

| | | | |
|---|---|---|---|
| EP | 1341335 A2 | 9/2003 |
| JP | 55132161 A | 10/1980 |
| JP | 04208707 A | 7/1992 |
| JP | 06120896 A | 4/1994 |
| JP | 06177840 A | 6/1994 |
| JP | 09008738 A | 1/1997 |
| JP | 09162816 A | 6/1997 |
| JP | 10247893 A | 9/1998 |
| JP | 11230857 A | 8/1999 |
| JP | 2001044956 A | 2/2001 |
| JP | 2003530761 T | 10/2003 |
| JP | 2004172783 A | 6/2004 |
| JP | 2004343678 A | 12/2004 |
| WO | 2011/097646 A1 | 8/2011 |

OTHER PUBLICATIONS

B. Volpe and W. Miller, "Cable-Tec Expo 2011: Advanced Troubleshooting in a DOCSIS © 3.0 Plant", Nov. 14-17, 2011.
PCT Search Report & Written Opinion, RE: Application #PCT/US2012/069048, Apr. 23, 2013.
Cisco Systems, Inc., "Configuring Load Balancing and Dynamic Channel Change (DCC) on the Cisco CMTS", URL: www.cisco.com/en/US/docs/cable/cmts/troubleshooting_batch9/cmtslbg.pdf (dated Jan. 2009).
B. Volpe, "DOCSIS 3.0 Partial Service", The Volpe Firm, URL: volpefirm.com/docsis-3-0-partial-service (blog posting dated Jul. 12, 2011).
B. Volpe, "DOCSIS 3.0 Tutorial—Upstream Channel Bonding", The Volpe Firm, URL: volpefirm.com/upstream-channel-bonding (blog posting dated Aug. 22, 2010).
B. Volpe, et al., "Cable-Tec Expo 2011: Advanced Troubleshooting in a DOCSIS 3.0 Plant", The Volpe Firm, URL: http://bradyvolpe.com/wp-content/uploads/2012/01/VM_Expo2011_v1-blog.pdf (dated Nov. 2011).
Cisco Systems, Inc. "Upstream Channel Bonding", URL: www.cisco.com/en/US/docs/ios/cable/configuration/guide/ubr_uscb.pdf (dated Nov. 2009 and last updated Jul. 2012).
Cable Television Laboratories, Inc., "A Simple Algorithm for Fault Localization Using Naming Convention and Micro-reflection Signature," Invention Disclosure 60193, 2 pages, Jun. 2008.
Cable Television Laboratories, Inc., "Data-Over-Cable Service Interface Specifications DOCSIS 3.0: MAC and Upper Layer Protocols Interface," CM-SP-MULPIv3.0-I16-110623, section 8, pp. 242-266, Jun. 2011.
Cable Television Laboratories, Inc., "Data-Over-Cable Service Interface Specifications DOCSIS® 3.0—MAC and Upper Layer Protocols Interface Specification," CM-SP-MULPIv3.0-I17-111117, Nov. 2011.
Cable Television Laboratories, Inc., "DOCSIS Best Practices and Guidelines: Proactive Network Maintenance Using Pre-Equalization," CM-GL-PNMP-V01-100415, Apr. 2010.
Cable Television Laboratories, Inc., "Pre-Equalization Based Proactive Network Maintenance Process Model for CMs Transmitting on Multiple Upstream Channels," Invention Disclosure 60203, 2 pages, May 2009.
Cable Television Laboratories, Inc., "Pre-Equalization based proactive network maintenance process model", Invention Disclosure 60177, 2 pages, Jun. 2008.
Cable Television Laboratories, Inc., "DOCSIS® Best Practices and Guidelines: Proactive Network Maintenance Using Pre-equalization," CM-GL-PNMP-V02-110623, Jun. 2011.
Cable Television Laboratories, Inc., "Data-Over-Cable Service Interface Specifications: DOCSIS 2.0 Radio Frequency Interface Specification," CM-SP-RFIv2.0-I06-040804, Apr. 2004.
L.A. Campos, et al., "Pre-equalization based Pro-active Network Maintenance Methodology", Cable Television Laboratories, Inc., presentation, 32 pages, 2008.
R. L. Howald, et al., "Customized Broadband—Analysis Techniques for Blended Multiplexes," NCTA Technical Papers, 2002.
R. Howald, "Access Networks Solutions: Introduction to S-CDMA," Presentation to Society of Cable Telecommunications Engineers (SCTE) South Florida Chapter, 2009.
R. Howald, "Upstream Snapshots & Indicators (2009)," Regional Samples, Presentation to Society of Cable Telecommunications Engineers (SCTE) South Florida Chapter, Jan. 2010.
R.L. Howald et al., "Characterizing and Aligning the HFC Return Path for Successful DOCSIS 3.0 Rollouts", SCTE Cable-Tec Expo, Oct. 2009.
R. Howald, et al., "DOCSIS 3.0 Upstream: Readiness & Qualification," SCTE Cable-Tec Expo, Oct. 2009.
R. Howald, et al., "The Grown-Up Potential of a Teenage PHY", NCTA Convention and Exposition, May 2012.
R. Howald, "DOCSIS 3.0 Upstream: Technology, RF Variables & Case Studies," Access Networks Solutions, 2009, presentation to Society of Cable Telecommunications Engineers (SCTE) South Florida Chapter, 23 pages, Jan. 2010.
R. Hranac, "Linear Distortions, Part 1," Communication Technology, Jul. 2005.
X. Liu, et al., "Variable Bit Rate Video Services in DOCSIS 3.0 Networks," NCTA Technical Papers, 2008.
Motorola, Inc., "White Paper: Expanding Bandwidth Using Advanced Spectrum Management," Sep. 25, 2003.
H. Newton, Newton's Telecom Dictionary, Flatiron Publishing, 9th ed., pp. 216 and 1023 (definitions of "carrier to noise ratio" and "signal to noise ratio"), Sep. 1995.
M. Patrick, et al., "Delivering Economical IP Video over DOCSIS by Bypassing the M-CMTS with DIBA," SCTE 2007 Emerging Technologies, NCTA Technical Papers, 2007.
A. Popper, et al., "An Advanced Receiver with Interference Cancellation for Broadband Cable Networks," 2002 International Zurich Seminar on Broadband Communications—Access, Transmission, Networking, pp. 23-1-23-6, IEEE, 2002.
A. Popper, et al, "Ingress Noise Cancellation for the Upstream Channel in Broadband Cable Access Systems," 2002 IEEE International Conference on Communications, vol. 3, pp. 1808-1812, IEEE, 2002.
S.U.H. Qureshi, "Adaptive Equalization," Proceedings of the IEEE, vol. 73, No. 9, pp. 1349-1387, Sep. 1985.
S. Ramakrishnan, "Scaling the DOCSIS Network for IPTV," SCTE Conference on Emerging Technologies, NCTA Cable Show, Apr. 2009.
Y. R. Shelke, "Knowledge Based Topology Discovery and Geolocalization", Thesis, Master of Science, Ohio State University, 2010.
R. Thompson, et al., "256-QAM for Upstream HFC," NCTA 2010 Spring Technical Forum Proceedings, pp. 142-152, May 2010.
R. Thompson, et al., "256-QAM for Upstream HFC Part Two", SCTE Cable-Tec Expo 2011, Technical Paper, Nov. 2011.
R. Thompson, et al., "Multiple Access Made Easy," SCTE Cable-Tec Expo 2011, Technical Paper, Nov. 2011.
R. Thompson, et al., "Optimizing Upstream Throughput Using Equalization Coefficient Analysis", National Cable & Telecommunications Association (NCTA) Technical Papers, Apr. 2009.
R. Thompson, et al., "Practical Considerations for Migrating the Network Toward All-Digital", Society of Cable Telecommunications Engineers (SCTE) Cable-Tec Expo, Oct. 2009.
R. Thompson, et al., "64-QAM, 6.4MHz Upstream Deployment Challenges," SCTE Canadian Summit, Toronto, Canada, Technical Paper, Mar. 2011.
B. Volpe, et al., "Cable-Tec Expo 2011: Advanced Troubleshooting in a DOCSIS© 3.0 Plant," Nov. 2011.
L. Wolcott, "Modem Signal Usage and Fault Isolation," U.S. Appl. No. 61/301,835, filed Feb. 5, 2010.
F. Zhao, et al., "Techniques for minimizing error propagation in decision feedback detectors for recording channels," IEEE Transactions on Magnetics, vol. 37, No. 1, pp. 592-602, Jan. 2001.
Y. Morishita, et al., "An LMS adaptive equalizer using threshold in impulse noise environments", IEEE, ICT 2003 10th International Conference on Telecommunications, vol. 1, pp. 578-582, Feb. 2003.

* cited by examiner

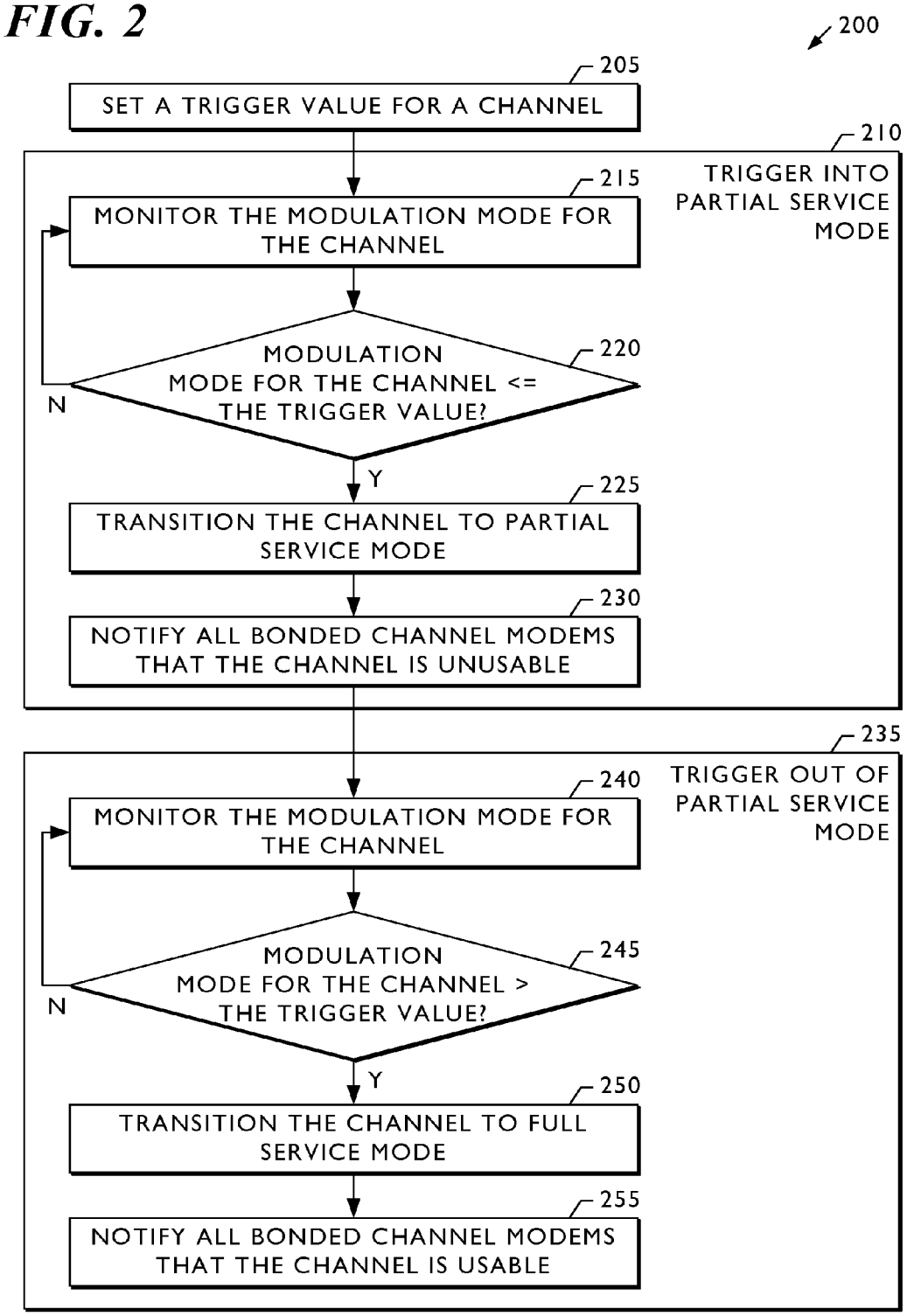

DYNAMIC CHANNEL BONDING PARTIAL SERVICE TRIGGERING

BACKGROUND

Data over cable service interface specification (DOCSIS) is an international telecommunications standard that permits the addition of high-speed data transfer to an existing cable television system. To maintain cross-version compatibility across all versions of DOCSIS, cable television operators utilize cable modems that support DOCSIS 1.X, 2.X, and 3.0, and that fall back to the highest supported version in common between both endpoints. Cable television operators use DOCSIS 3.0 to provide two-way communication over their existing hybrid fiber-coaxial (HFC) infrastructure.

An HFC network is a broadband network that combines optical fiber and coaxial cable. The HFC network is a two-way communication network between a cable modem termination system (CMTS) and a cable modem. The CMTS is communication equipment typically located in a cable operator's headend facility. The CMTS collects and processes communication signals, distributes those signals to customer locations using downstream channels, and receives other communication signals from the customer locations on upstream channels. The cable modem is a communication device that receives the communication signals on the downstream channels from the CMTS, and transmits the other communication signals to the CMTS on the upstream channels. The cable modem may be a standalone device that connects to the Internet, or integrated with a set-top box.

The DOCSIS 1X and 2.X specifications describe the channel frequency and modulation characteristics for downstream and upstream transmissions. When the CMTS communicates with a device, the DOCSIS 1.X or 2.X cable modem at a customer location uses the frequencies (channels) of the CMTS transmitter and receiver to which the modem is physically connected to carry the downstream and upstream transmissions. The term "channel" as used herein is synonymous with the term "receiver". If the channel becomes impaired, the modulation mode of the channel can drop, resulting in a reduction in the bandwidth to the device.

Channel bonding is a DOCSIS 3.0 feature that enables a DOCSIS 3.0 cable modem at a customer location to use multiple downstream channels, or multiple upstream channels, together at the same time. For example, a cable modem configured with four upstream channels can use DOCSIS 3.0 channel bonding to increase the throughput of the upstream communication with the CMTS. The cable modem distributes, or segments, the data packets among the four channels in an upstream bonding group and transmits the data packets to the CMTS in parallel, rather than in series. When the upstream bonding group operates in full service mode, the CMTS receives and reassembles the data packets on all four channels in the upstream bonding group. If there is a problem receiving data packets on a CMTS receiver, due to an upstream channel that is associated with the receiver being impaired or unavailable, the CMTS cannot properly reassemble the data packets for the upstream bonding group and data loss or throughput degradation will result. The detection of this problem will allow communication to continue between the CMTS and cable modem by transitioning the upstream bonding group to operate in partial service mode by disabling data grant scheduling on the faulty receiver/channel.

When DOCSIS 1.X, 2.X, and 3.0 modems are registered to use a channel that becomes impaired, a decrease in bandwidth on the impaired channel, which can also result from a lowering of the modulation profile due to noise, is a greater impact on the DOCSIS 1.X and 2.X modems, because the DOCSIS 3.0 modem has other bonded channels to use for data passing as long as the impaired channel is in partial service mode. If the DOCSIS 3.0 modem is not yet in partial service mode, the DOCSIS 3.0 modem cannot reassemble the packets. In addition, the reduction in bandwidth may cause an increase in utilization based on the bandwidth size, and may trigger unnecessary load balancing with the possibility of losing modems when they attempt to move to another channel. Furthermore, a configuration change by the cable operator may cause a decrease in the modulation mode. There is a need for a method of controlling when a channel transitions to partial service mode to make valuable bandwidth available for other resources. The presently disclosed invention satisfies this demand.

SUMMARY

Aspects of the present invention provide a method and computing device for transitioning into and out of partial service mode to make valuable bandwidth available for other resources. The method sets a trigger value for a channel, where a first cable modem and a second cable modem have registered to use the channel, and where the first cable modem is a bonded channel modem that utilizes a bonding group that includes the channel and at least one other channel. The method then monitors a modulation mode for the channel. The method transitions the channel from full service mode to partial service mode when the channel is in full service mode and the monitoring detects that the modulation mode is less than or equal to the trigger value. The method transitions the channel from partial service mode to full service mode when the channel is in partial service mode and the modulation mode for the channel is greater than the trigger value.

BRIEF DESCRIPTION OF THE DRAWINGS

FIG. 2 is a flow diagram that illustrates a method of transitioning into and out of partial service mode to make valuable bandwidth available for other resources according to one embodiment of the present invention.

DETAILED DESCRIPTION

Figure 1:
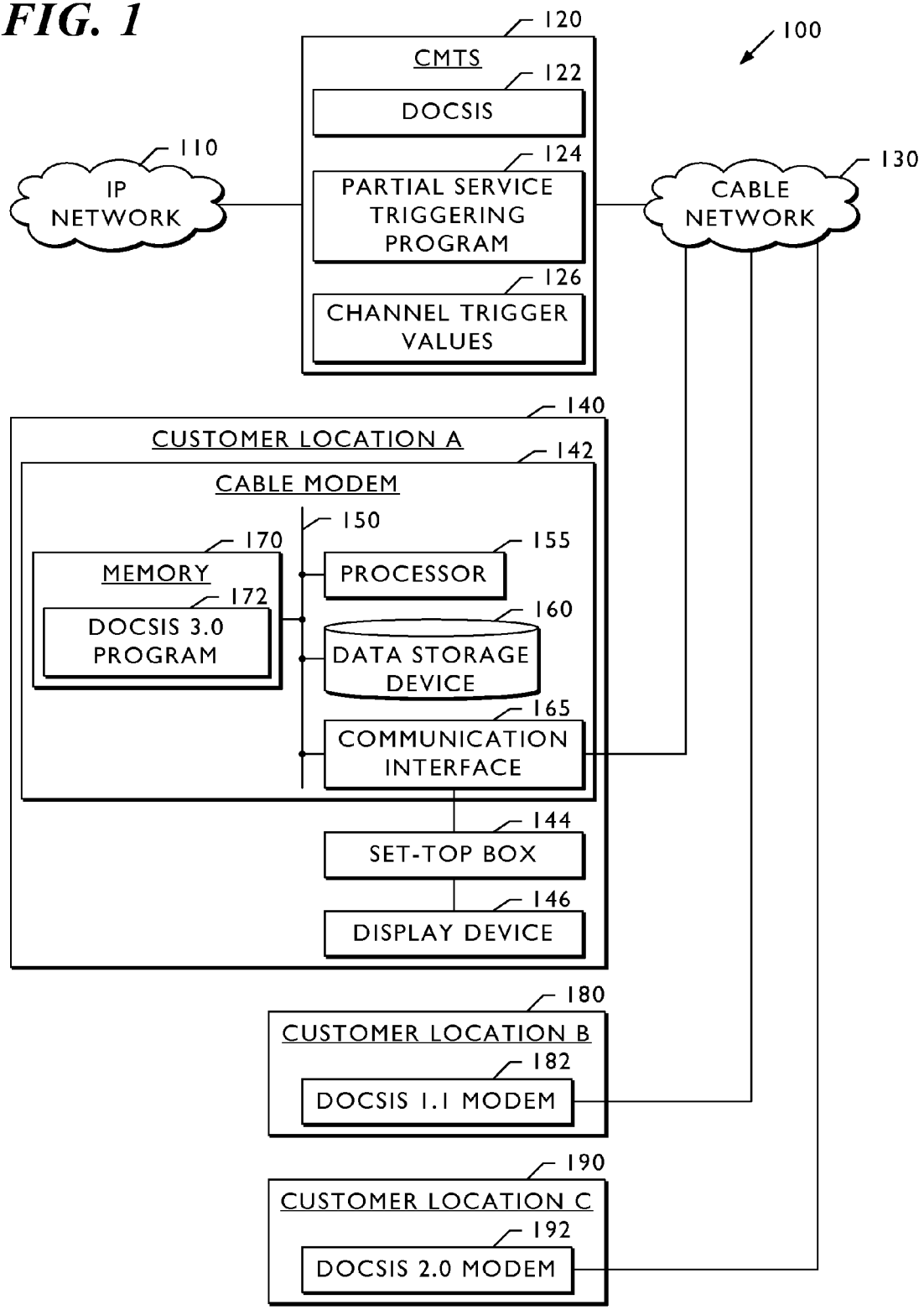
FIG. 1 is a block diagram that illustrates one embodiment of the hardware components of a system that performs the present invention.

FIG. 1 is a block diagram that illustrates one embodiment of the hardware components of a system that performs the present invention. A broadband network 100 includes an Internet protocol (IP) network 110, cable modem termination system (CMTS) 120, cable network 130, customer location A 140, customer location B 180, and customer location C 190. The broadband network 100 shown in FIG. 1 may include any number of interconnected IP network 110, CMTS 120, cable network 130, customer location A 140, customer location B 180, and customer location C 190 components.

The IP network 110 shown in FIG. 1, in one embodiment, is a public communication network or wide area network (WAN) that connects to the CMTS 120. The present invention also contemplates the use of comparable network architectures including a LAN, a personal area network (PAN) such as a Bluetooth network, a wireless LAN (e.g., a wireless-fidelity (Wi-Fi) network), peer-to-peer overlay network, and a virtual private network (VPN). The system contemplates comparable network architectures and protocols such as Ethernet and transmission control protocol.

The cable network 130 shown in FIG. 1, in one embodiment, is a hybrid fiber-coaxial (HFC) network. The cable network 130 is a data and video content network that provides two-way communication between the CMTS 120 and customer location A 140, customer location B 180 or customer location C 190. The downstream communication path is from the CMTS 120 to a customer location (e.g., customer location A 140, customer location B 180, or customer location C 190). The upstream communication path is from a customer location (e.g., customer location A 140, customer location B 180, or customer location C 190) to the CMTS 120.

The CMTS 120, in one embodiment, is communication equipment located in a cable operator's headend or hubsite that provides high-speed data services, such as cable Internet or voice over Internet protocol, to cable subscribers. The CMTS 120 shown in FIG. 1 includes at least one computing device, each having one or more processors, that provides customer location A 140, customer location B 180, and customer location C 190 with various services and connections. This includes support for data over cable service interface specification (DOCSIS) 122 services (e.g., DOCSIS 1.X, DOCSIS 2.X, and DOCSIS 3.0), partial service triggering program 124, channel trigger values 126, IP network 110 connections, and cable network 130 connections. The partial service triggering program 124 and channel trigger values 126, together with the cable modem 142, performs the method of the present invention disclosed in the exemplary embodiments depicted in FIG. 2. The IP network 110 connections enable the CMTS 120 to provide access to external services such as video servers, public switched telephone network voice, multimedia messages, and Internet data.

Customer location A 140 shown in FIG. 1 is a customer's home, business, or another location where the customer accesses the cable service. In one embodiment, customer location A 140 includes a cable modem 142, set-top box 144, and display device 146. In other embodiments, the set-top box 144 is a digital television (DTV) Converter (DTC) or other customer-premises equipment (CPE), and the display device 146 is an Internet protocol television (IPTV) or analog television. In yet another embodiment, the set-top box 144 includes the cable modem 142.

The cable modem 142 shown in FIG. 1, in one embodiment, is a general-purpose computing device that performs the present invention together with the partial service triggering program 124 and channel trigger values 126 on the CMTS 120. A bus 150 is a communication medium connecting a processor 155, data storage device 160 (such as a serial ATA (SATA) hard disk drive, optical drive, small computer system interface (SCSI) disk, flash memory, or the like), communication interface 165, and memory 170 (such as random access memory (RAM), dynamic RAM (DRAM), non-volatile computer memory, flash memory, or the like). The communication interface 165 connects the cable modem 142 to the cable network 130 and allows for two-way communication of data and content. In one embodiment, the set-top box 144 includes the cable modem 142 implemented as an application-specific integrated circuit (ASIC).

The processor 155 performs the disclosed methods by executing sequences of operational instructions that comprise each computer program resident in, or operative on, the memory 170. The reader should understand that the memory 170 may include operating system, administrative, and database programs that support the programs disclosed in this application. In one embodiment, the configuration of the memory 170 of the cable modem 142 includes a DOCSIS 3.0 program 172. The DOCSIS 3.0 program 172 is an implementation of DOCSIS 3.0 that, together with the partial service triggering program 124 and channel trigger values 126, performs the method of the present invention disclosed in the exemplary embodiments depicted in FIG. 2. When the processor 155 performs the disclosed method, it stores intermediate results in the memory 170 or data storage device 160. In another embodiment, the processor 155 may swap these programs, or portions thereof, in and out of the memory 170 as needed, and thus may include fewer than all of these programs at any one time.

Customer location B 180 shown in FIG. 1 is a customer's home, business, or another location where the customer accesses the cable service. In one embodiment, customer location B 180 includes hardware components (not shown) similar to those shown in customer location A 140. The only difference is that customer location B 180 includes a DOCSIS 1.1 modem 182 that implements the DOCSIS 1.1 specification to replace the cable modem 142 that implements the DOCSIS 3.0 specification in customer location A 140.

Customer location C 190 shown in FIG. 1 is a customer's home, business, or another location where the customer accesses the cable service. In one embodiment, customer location C 190 includes hardware components (not shown) similar to those shown in customer location A 140. The only difference is that customer location C 190 includes a DOCSIS 2.0 modem 192 that implements the DOCSIS 2.0 specification to replace the cable modem 142 that implements the DOCSIS 3.0 specification in customer location A 140.

FIG. 2 is a flow diagram that illustrates a method of transitioning into and out of partial service mode to make valuable bandwidth available for other resources according to one embodiment of the present invention. In one embodiment, the present invention can apply to upstream channels only. In another embodiment, the present invention can apply to downstream channels only. In yet another embodiment, the present invention can apply to either upstream channels or downstream channels, or to both upstream channels and downstream channels.

The process 200 shown in FIG. 2 begins when the CMTS 120 sets a trigger value for a channel (step 205). In one embodiment, a cable operator sends a configuration parameter to the CMTS 120 that causes the CMTS 120 to store a trigger value for a specified upstream or downstream channel. Once the trigger value is set, the process 200 determines when to trigger into partial service mode (step 210), and when to trigger out of partial service mode (step 235).

To determine when to trigger into partial service mode (step 210), the process 200 monitors the modulation mode for the channel (step 215). In one embodiment, the modulation mode for the channel is whether the channel is operating in 64 QAM, 32 QAM, 16 QAM or 8 QAM, and the trigger value is 16 QAM. In other embodiments, the present invention contemplates other modulation modes for the channel (e.g., 256 QAM, 128 QAM, and the like), other modulation modes for a spectrum group, and priorities for a modulation profile hopping rule. While the modulation mode for the channel is greater than the trigger value (step 220, N branch), the process 200 continues to monitor the modulation mode for the channel (step 215). When the modulation mode for the channel is less than or equal to the trigger value (step 220, Y branch), the process 200 transitions the channel to partial service mode (step 225). The process 200 then notifies all bonded channel modems (i.e., DOCSIS 3.0 modems) that the channel is unusable (step 230).

To determine when to trigger out of partial service mode (step 235), the process 200 monitors the modulation mode for the channel (step 240). While the modulation mode for the channel is less than or equal to the trigger value (step 245, N branch), the process 200 continues to monitor the modulation mode for the channel (step 240). When the modulation mode for the channel is greater than the trigger value (step 245, Y branch), the process 200 transitions the channel to full service mode (step 250). The process 200 then notifies all bonded channel modems (i.e., DOCSIS 3.0 modems) that the channel is usable (step 255).

In the method shown in FIG. 2, the purpose of transitioning into partial service mode is to free valuable bandwidth for DOCSIS 1.X and 2.X modems, while temporarily transitioning DOCSIS 3.0 bonded channel modems into partial service. The purpose of transitioning back to full service mode is to allocate available valuable bandwidth for DOCSIS 3.0 bonded channel modems. The trigger value is a configuration parameter for transitioning into and out of partial service mode. In one embodiment, the cable operators are provided the trigger value, thereby giving them full control of this functionality. The configuration parameter allows the cable operator to select a modulation mode used to trigger the transition into and out of partial service mode for a particular channel. In various embodiments, the configuration parameter is a modulation mode per channel association, a modulation mode configurable per spectrum group, and the modification of a priority of an existing modulation profile hopping rule. Furthermore, the configuration parameter has a setting that disables the functionality if the cable operator does not want to use it.

The following two examples illustrate the method of transitioning into and out of partial service mode shown in FIG. 2 in which a DOCSIS 1.1 modem, DOCSIS 2.0 modem, and DOCSIS 3.0 modem have registered to use an upstream channel. The first example illustrates the impact on the bandwidth to the DOCSIS 1.1 modem, DOCSIS 2.0 modem, and DOCSIS 3.0 modem when the innovation of the present invention is disabled. The second example illustrates the improvements realized when the innovation of the present invention is enabled. Finally, even though these examples focus on an upstream channel, one skilled in the art will realize that these examples are easily adaptable to downstream channels.

With the innovation of the present invention disabled, a DOCSIS 1.1 modem 182, DOCSIS 2.0 modem 192, and DOCSIS 3.0 cable modem 142 registers to use an upstream channel on the CMTS 120. The channel is operating in 64 QAM modulation mode with spare hopping modulation modes such as 32 QAM, 16 QAM, and 8 QAM. When the channel becomes impaired and the modulation mode drops to 16 QAM, this greatly reduces the available bandwidth for all modems, especially the DOCSIS 1.1 modem 182 and DOCSIS 2.0 modem 192. Since the DOCSIS 3.0 cable modem 142 is bonded, it still has other channels to use for data passing and only takes a small overall bandwidth hit. If the channel becomes more impaired and the modulation mode drops to 8 QAM, the DOCSIS 1.1 modem 182 and DOCSIS 2.0 modem 192 are really limited in their ability to pass data, but the DOCSIS 3.0 cable modem 142 still has other channels to use. If the channel impairment is bad enough, the DOCSIS 1.1 modem 182 and DOCSIS 2.0 modem 192 may not be able to pass data or even stay registered because there is not enough bandwidth to support all of the ranging requests. The reduction of bandwidth (causing an increase in utilization based on bandwidth size) may also trigger unnecessary load balancing with the possibility of losing modems when they attempt to move to another channel. If the channel impairment then goes away and the modulation mode for the channel increases to 64 QAM, the channel may now be underutilized if the modems were moved by load balancing. In addition, since the DOCSIS 1.1 modem 182 and DOCSIS 2.0 modem 192 also carry voice traffic, the reduction of bandwidth may also result in dropping voice calls or the failure to initiate a voice call.

With the innovation of the present invention enabled, a DOCSIS 1.1 modem 182, DOCSIS 2.0 modem 192, and DOCSIS 3.0 cable modem 142 registers to use an upstream channel on the CMTS 120. The channel is operating in 64 QAM modulation mode with spare hopping modulation modes such as 32 QAM, 16 QAM, and 8 QAM. The cable operator configures the partial service mode trigger value for the channel to be 16 QAM. When the channel becomes impaired and the modulation mode drops to 16 QAM, the present invention will transition the channel into partial service mode. This means the channel is marked as unusable for all bonded modems using it, such as the DOCSIS 3.0 cable modem 142. The bonded modems still have multiple channels to pass data on. Now all the bandwidth that the DOCSIS 3.0 cable modem 142 was using is now available for use by the DOCSIS 1.1 modem 182 and DOCSIS 2.0 modem 192. If the channel becomes more impaired and the modulation mode drops to 8 QAM, the present invention does not place the DOCSIS 1.1 modem 182 and DOCSIS 2.0 modem 192 in as much danger of being dropped with the reduction of bandwidth because the bonded modems are not using the channel. If the channel impairment decreases and the modulation mode only goes back to 16 QAM, the DOCSIS 3.0 cable modem 142 is still not able to use the channel but there is more bandwidth for the DOCSIS 1.1 modem 182 and DOCSIS 2.0 modem 192. If the channel impairment then goes away and the modulation mode for the channel goes back to 64 QAM, the channel comes out of partial service because the modulation mode is greater than the trigger mode and the bonded modems are able to reuse the channel again. Thus, there was no unnecessary load balancing or fear of losing modems in the move. In addition, voice calls on the DOCSIS 1.1 modem 182 and DOCSIS 2.0 modem 192 were probably not affected. The DOCSIS 3.0 cable modem 142 still had multiple channels to use and the DOCSIS 1.1 modem 182 and DOCSIS 2.0 modem 192 had their share of bandwidth.

The modulation modes do not have to hit exactly on the trigger value for the channel or configured modulation mode. If the channel goes from 64 QAM to 8 QAM with a trigger value of 16 QAM, then the channel goes into partial service because the active modulation mode went below the trigger value. The same holds true for coming out of partial service. If the channel goes from 8 QAM to 32 QAM it comes out of partial service because the active modulation mode is better than the trigger mode.

Although the disclosed embodiments describe a fully functioning method and computing device of transitioning into and out of partial service mode to make valuable bandwidth available for other resources, the reader should understand that other equivalent embodiments exist. Since numerous modifications and variations will occur to those reviewing this disclosure, the method and computing device of transitioning into and out of partial service mode to make valuable bandwidth available for other resources is not limited to the exact construction and operation illustrated and disclosed. Accordingly, this disclosure intends all suitable modifications and equivalents to fall within the scope of the claims.

We claim:

1. A method, comprising:
   setting a trigger value for a channel, wherein a first cable modem and a second cable modem have registered to use the channel, and wherein the first cable modem is a bonded channel modem that utilizes a bonding group that includes the channel and at least one other channel;

monitoring a modulation mode for the channel;

transitioning the channel from full service mode to partial service mode when the channel is in full service mode and the monitoring detects that the modulation mode is less than or equal to the trigger value, wherein transitioning the channel from full service mode to partial service mode comprises marking the channel as unusable for cable modems that support channel bonding, whereby all bandwidth of the channel in partial service mode is made unavailable for use by the first cable modem and all bandwidth of the channel is made available for use by one or more cable modems that do not support channel bonding; and transitioning the channel from partial service mode to full service mode when the channel is in partial service mode and the modulation mode for the channel is greater than the trigger value.

2. The method of claim 1, wherein the setting of the trigger value further comprises:
receiving the trigger value for the channel; and
storing the trigger value for the channel.

3. The method of claim 1, wherein the trigger value is at least one of a modulation mode for the channel, a modulation mode for a spectrum group, and a priority for a modulation profile hopping rule.

4. The method of claim 1, wherein the transitioning of the channel from full service mode to partial service mode further comprises:
notifying the first cable modem that the channel is in partial service mode, thereby marking the channel as unusable by the first cable modem.

5. The method of claim 1, wherein the transitioning of the channel from partial service mode to full service mode further comprises:
notifying the first cable modem that the channel is in full service mode, thereby marking the channel as usable by the first cable modem.

6. The method of claim 1, wherein the first cable modem is a DOCSIS 3.0 modem, and wherein the second cable modem is at least one of a DOCSIS 1.X modem, and a DOCSIS 2.X modem.

7. A computing device, comprising:
a memory device resident in the computing device; and
a processor disposed in communication with the memory device, the processor configured to:
set a trigger value for a channel, wherein a first cable modem and a second cable modem have registered to use the channel, and wherein the first cable modem is a bonded channel modem that utilizes a bonding group that includes the channel and at least one other channel;
monitor a modulation mode for the channel;
transition the channel from full service mode to partial service mode when the channel is in full service mode and the monitoring detects that the modulation mode is less than or equal to the trigger value, wherein transitioning the channel from full service mode to partial service mode comprises marking the channel as unusable for cable modems that support channel bonding, whereby all bandwidth of the channel in partial service mode is made unavailable for use by the first cable modem and all bandwidth of the channel is made available for use by one or more cable modems that do not support channel bonding; and transition the channel from partial service mode to full service mode when the channel is in partial service mode and the modulation mode for the channel is greater than the trigger value.

8. The computing device of claim 7, wherein to set the trigger value, the processor is further configured to:
receive the trigger value for the channel; and
store the trigger value for the channel.

9. The computing device of claim 7, wherein the trigger value is at least one of a modulation mode for the channel, a modulation mode for a spectrum group, and a priority for a modulation profile hopping rule.

10. The computing device of claim 7, wherein to transition the channel from full service mode to partial service mode, the processor is further configured to:
notify the first cable modem that the channel is in partial service mode, thereby marking the channel as unusable by the first cable modem.

11. The computing device of claim 7, wherein to transition the channel from partial service mode to full service mode, the processor is further configured to:
notify the first cable modem that the channel is in full service mode, thereby marking the channel as usable by the first cable modem.

12. The computing device of claim 7, wherein the first cable modem is a DOCSIS 3.0 modem, and wherein the second cable modem is at least one of a DOCSIS 1.X modem, and a DOCSIS 2.X modem.

13. A system, comprising:
a cable modem termination system (CMTS) that stores a trigger value for a channel, and that monitors a modulation mode for the channel;
a first cable modem registered to use the channel, wherein the first cable modem is a bonded channel modem that utilizes a bonding group that includes the channel and at least one other channel;
a second cable modem registered to use the channel,
wherein when the channel is in full service mode and the modulation mode for the channel is less than or equal to the trigger value, the CMTS transitions the channel from full service mode to partial service mode, wherein transitioning the channel from full service mode to partial service mode comprises marking the channel as unusable for cable modems that support channel bonding, whereby all bandwidth of the channel in partial service mode is made unavailable for use by the first cable modem and all bandwidth of the channel is made available for use by one or more cable modems that do not support channel bonding; and
wherein when the channel is in partial service mode and the modulation mode for the channel is greater than the trigger value, the CMTS transitions the channel from partial service mode to full service mode.

14. The system of claim 13, wherein the trigger value is at least one of a modulation mode for the channel, a modulation mode for a spectrum group, and a priority for a modulation profile hopping rule.

15. The system of claim 13, wherein to transition the channel from full service mode to partial service mode, the CMTS notifies the first cable modem that the channel is in partial service mode, thereby marking the channel as unusable by the first cable modem.

16. The system of claim 13, wherein to transition the channel from partial service mode to full service mode, the CMTS notifies the first cable modem that the channel is in full service mode, thereby marking the channel as usable by the first cable modem.

17. The system of claim 13, wherein the first cable modem is a DOCSIS 3.0 modem, and wherein the second cable modem is at least one of a DOCSIS 1.X modem, and a DOCSIS 2.X modem.

18. A non-transitory computer-readable medium, comprising computer-executable instructions that, when executed on a computing device, perform steps of:
- setting a trigger value for a channel, wherein a first cable modem and a second cable modem have registered to use the channel, and wherein the first cable modem is a bonded channel modem that utilizes a bonding group that includes the channel and at least one other channel;
- monitoring a modulation mode for the channel;
- transitioning the channel from full service mode to partial service mode when the channel is in full service mode and the monitoring detects that the modulation mode is less than or equal to the trigger value, wherein transitioning the channel from full service mode to partial service mode comprises marking the channel as unusable for cable modems that support channel bonding, whereby all bandwidth of the channel in partial service mode is made unavailable for use by the first cable modem and all bandwidth of the channel is made available for use by one or more cable modems that do not support channel bonding; and
- transitioning the channel from partial service mode to full service mode when the channel is in partial service mode and the modulation mode for the channel is greater than the trigger value.

\* \* \* \* \*